US008543712B2

(12) United States Patent  (10) Patent No.: US 8,543,712 B2
Chandolu et al.  (45) Date of Patent: Sep. 24, 2013

(54) EFFICIENT CONFIGURATION OF LDAP USER PRIVILEGES TO REMOTELY ACCESS CLIENTS WITHIN GROUPS

(75) Inventors: Uma Maheswara Rao Chandolu, Austin, TX (US); Puneet Mahajan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 12/033,179

(22) Filed: Feb. 19, 2008

(65) Prior Publication Data

US 2009/0210541 A1  Aug. 20, 2009

(51) Int. Cl.
*G06F 15/173* (2006.01)
*G06F 15/16* (2006.01)
*G06F 12/14* (2006.01)
*H04W 4/00* (2009.01)

(52) U.S. Cl.
USPC ............ 709/229; 709/225; 713/201; 370/313

(58) Field of Classification Search
USPC .................................................. 709/227–229
See application file for complete search history.

(56) References Cited

U.S. PATENT DOCUMENTS

| | | | |
|---|---|---|---|
| 6,957,364 B2 | 10/2005 | Shimooka et al. | |
| 7,260,664 B2 | 8/2007 | Arndt et al. | |
| 2002/0124201 A1 | 9/2002 | Edwards et al. | |
| 2003/0131113 A1* | 7/2003 | Reeves et al. ................. | 709/229 |
| 2005/0080897 A1* | 4/2005 | Braun et al. .................. | 709/225 |
| 2006/0010031 A1 | 1/2006 | Higuchi et al. | |
| 2006/0086788 A1* | 4/2006 | Zhang et al. .................. | 235/382 |
| 2006/0195642 A1 | 8/2006 | Arndt et al. | |
| 2007/0244896 A1* | 10/2007 | Liu et al. ........................... | 707/9 |
| 2008/0025243 A1* | 1/2008 | Corneille et al. ............. | 370/313 |

OTHER PUBLICATIONS

Geraghty, Ed; "Integrating AIX into Heterogeneous LDAP Environments"; May 2006; pp. 35-36; published by International Business Machines Corp.; Armonk, NY, USA; retrieved on Feb. 4, 2008, from http://www.redhooks.ibm.com/abstracts/sg247165.html.

Tuttle, Steven; "Understanding LDAP: Design and Implementation"; Jun. 2004; pp. 52, 69, 201, ; published by International Business Machines Corp.; Armonk, NY, USA; retrieved on Feb. 4, 2008, from: http://www.redbooks.ibm.com/abstracts/sg244986.html. tem.

(Continued)

*Primary Examiner* — Evans Desrosiers
(74) *Attorney, Agent, or Firm* — Robert H. Frantz; David A. Mims, Jr.

(57) ABSTRACT

A method and system for restricting remote access by users of directory access protocol client systems without using an directory access protocol "netgroup" option by defining a "remote_allowed" attribute for a entire user group, which, if enabled, allows granting of all remote access requests to all clients, but which, if disabled, allows granting of remote access requests to client systems specifically listed in a "hosts" attribute. In this manner, directory administrators may configure remote access rights for groups of users without having to perform cumbersome and tedious "netgroup". Subsequent to granting access, the authentication, such as a log in, may be performed on the user. The invention is particularly useful for Lightweight Directory Access Protocol (LDAP) systems, where the "hosts" attribute can list client systems by Internet Protocol address, by hostname, or a by combination of address and hostname.

12 Claims, 14 Drawing Sheets

(56) References Cited

OTHER PUBLICATIONS

Wikipedia; "Network File System"; date unknown; published by Wikimedia Foundation; 4 pages; San Francisco, CA, USA; retrieved Feb. 4, 2008, from http://en.wikipedia.org/wiki/Network_file_sys
Whatismyipaddress.com; "What is a hostname?"; retrieved on Feb. 6, 2011 from http://whatismyipaddress.com/hostname.
Jones, Brian; "SysAdmin to SysAdmin; Netgroups are not just for NIS anymore";retrieved on Feb. 7, 2011 from http://www.linux.com/archive/articles/113679?theme=print.
Przygode, Jeremy; "Summary: LDAP authentication using netgroups"; retrieved on Feb. 7, 2011 from http://www.sunmanagers.org/pipermail/summaries/2002-January/000604.html.

* cited by examiner

EFFICIENT CONFIGURATION OF LDAP USER PRIVILEGES TO REMOTELY ACCESS CLIENTS WITHIN GROUPS

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

The present invention relates generally to systems and methods for configuring and controlling remote access to LDAP clients by users who are organized into groups of users.

2. Background of the Invention

There are many texts and references available in the art regarding Lightweight Directory Access Protocol, or "LDAP", including "Integrating AIX into Heterogeneous LDAP Environments" by Ed Geraghty, et al., Fourth Edition, published in May, 2006, and "Understanding LDAP: Design and Implementation" by Steven Tuttle, et al., Second Edition, published in June, 2004, both published by International Business Machines Corp.

According to Denis Howe's Free Online Dictionary of Computing (FOLDOC), Lightweight Directory Access Protocol, or "LDAP", is an open, standardized protocol defined by the Internet Engineering Task Force, or "IETF", for accessing online directory services such as structured repositories of information regarding an organization's resources, personnel, etc.

LDAP was developed in response to shortcomings of the more complicated X.500 structure defined by the International Telecommunications Union, which did not provide for efficient integration of the Internet with other networks.

The protocol includes aspects user information, hardware and software information for those users, as well as some policies governing the rights and privileges assigned to those users for accessing information in the LDAP repositories.

By abstracting all of this detailed network information, users are allowed to access the repositories, and to interact with each other, with little or no knowledge of the details of the network topology, or the various protocols being used by each user to access the network.

Many companies have adopted or added support for LDAP to their computing products, including Netscape, Novell, Sun, Hewlett-Packard, IBM, Lotus, Banyan, and Silicon Graphics, Inc.

Basics of LDAP.

This disclosure is written with the understanding that one of ordinary skill in the art has a basic understanding of LDAP, its installation, configuration, operation, and administration.

LDAP directories contain "entries" organized usually in a hierarchical structure mimicking geographic or organizational structures, such as that shown in FIG. 5, which is substantially reproduced from the book "Understanding LDAP: Design and Implementation" by Steven Tuttle. This eases conceptualization of how the stored data relates to the organization who owns it, uses it, or produces it. This structure can be called a "tree" (500), where the "top of the tree" (501) represents the highest level of the organization, highest level of integration, or highest level of abstraction of the organization. Entries placed in the "tree" below the top of the tree (502-504) represent subsets or groups within the entity at the top of the tree. For example, for a corporate database, the top of the tree might represent the entire corporation's personnel directory. At a first level down from the top might be several global regions, such as North America, Asia, Europe, Africa/Middle East, etc. Below that level might be specific divisions of the company within countries, such as India below Asia, Canada below North America, Germany below Europe, etc. And, further below the countries may be national regions, such as Punjab below India, Ontario below Canada, or Bayern below Germany. At a bottom level may be one or more actual data repositories, such as a human resources database containing names of all employees for that corporation in that country and state or province, and certain other information about those employees, such as telephone number, building and location, immediate manager, job title, etc.

LDAP directory entries are collections of attributes, where the attribute collection is identified by a "distinguished name", or "DN". Each DN unambiguously and uniquely refers to one and only one LDAP entry.

Each attribute within an entry is assigned a "type" (variable, constant, functions, expression, etc.) and one or more "values". For ease of use, mnemonic strings are often used for the type, such as "mail" for an email address attribute or "jpegPhoto" for a photograph file. For an email address attribute, the "values" stored in the LDAP repository would necessarily have to conform to the format of an email address, for example.

Some of those in the art think of LDAP less as a data arrangement and more as a protocol, because the LDAP specification actually specifies messages, responses, and procedures for accessing LDAP-arranged data. As a protocol, it enables heterogeneous application programs to access the same data repository, such as the arrangement (600) shown in FIG. 6 where application servers, web servers, email applications, and a telephone directory application all access a common data repository (601) by employing LDAP concepts and protocols. FIG. 6 is also substantially reproduced from Tuttle's book mentioned in the previous paragraphs.

As such, LDAP directories, and the LDAP protocol, are well known and widely used by companies, organizations, and governments worldwide. Improvements to LDAP are expected to be profitable and to have significant impact due to this large user base.

SUMMARY OF THE INVENTION

The present invention encompasses systems and methods for restricting remote access by users of directory access protocol client systems without using an directory access protocol "netgroup" option by defining a "remote_allowed" attribute for a entire user group, which, if enabled, allows granting of all remote access requests to all clients, but which, if disabled, allows granting of remote access requests to client systems specifically listed in a "hosts" attribute. In this manner, directory administrators may configure remote access rights for groups of users without having to perform cumbersome and tedious "netgroup". Subsequent to granting access, authentication such as a login may be performed on the user. The invention is particularly useful for Lightweight Directory Access Protocol (LDAP) systems, where the "hosts" attribute can list client systems by Internet Protocol address, by hostname, or a by combination of address and name.

BRIEF DESCRIPTION OF THE DRAWINGS

The following detailed description when taken in conjunction with the figures presented herein provide a complete disclosure of the invention.

DETAILED DESCRIPTION OF EXEMPLARY EMBODIMENTS OF THE INVENTION

Figure 1:
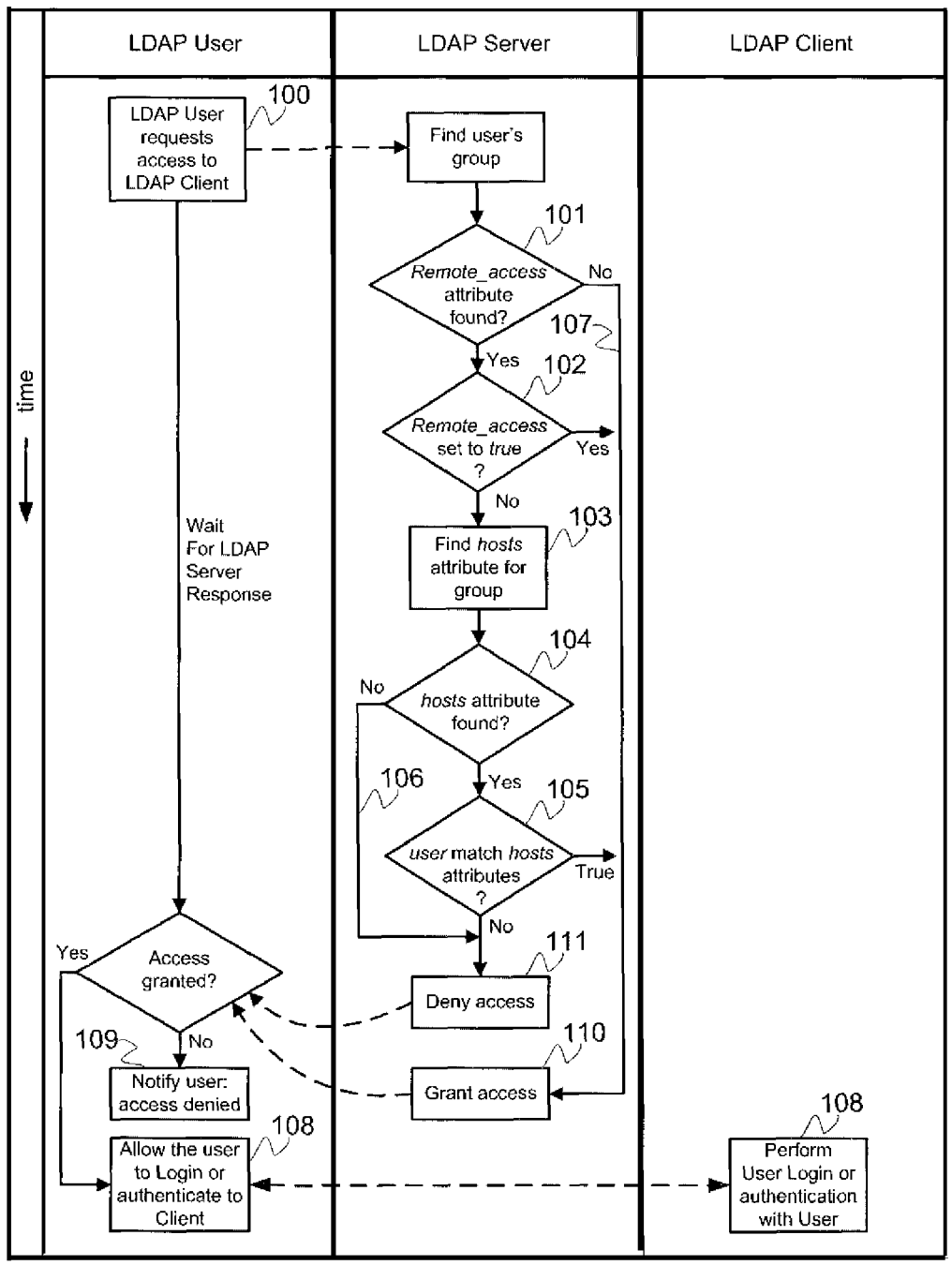
FIG. 1 shows a logical process of authorization of remote access to clients within an LDAP environment according to the present invention.

We, the inventors of the present invention, have recognized and solved problems previously unrecognized by others in the art of restricting access to information by LDAP clients. As will be explained in the following paragraphs, current methods for administrating client privileges and rights to groups of clients and more particularly to individual clients are cumbersome and tedious, requiring many hours of administrator effort, and often resulting in frustrating restrictions to clients who need access. And, sometimes, errors in administering LDAP rights allows clients to access information who should not have access to the information, representing undesirable privacy and security risks.

The following example embodiments and example methods of use of the invention will be described with respect to integration to IBM's well-known, and widely-used AIX operating system. It will be readily recognized by those skilled in the art, however, that the present invention may be realized and utilized in conjunction with other operating systems and computing environments.

The Process Followed by Typical LDAP Administrators

Those of ordinary skill in the art at the time we are filing this application tend to follow a process which is labor intensive, and only somewhat effective. Either out of habit, for lack of a better method, for lack of a better tool, or for some combination of these factors, ordinarily skilled administrators continue to use this cumbersome process. As will be described in later paragraphs, we have recognized this problem when we see no one else describing or addressing this problem. First, though, we will describe the current methods and tools used by typical administrators to manage LDAP client access rights.

In the method used by those of ordinary skill in the art at this time, an administrators use a concept called a "netgroup" to administer access privileges to LDAP clients and their users. Here, we will refer to machines and computer processes which access the LDAP data as "clients", and the humans who operate those clients as users. In some instances, the terms are used interchangeably or collectively, as is the conventional manner of speak in the LDAP technology community.

Basics of "Netgroups".

According to IBM's published "RedBook" entitled "Integrating AIX into Heterogeneous LDAP Environments", by Ed Geraghty, et al., (our emphasis added) "a netgroup is a list of user names or hostnames used in the NIS environment under a specific netgroup name to provide or restrict access of resources such as files, applications, or login. Netgroups can be used to define the hosts a group of users are allowed to log in to, specify automount information, and limit the hosts allowed to mount an NFS file system. Netgroups can also be used in /etc/hosts.equiv or in a user's .rhost file to grant or deny login permissions for a group of users or hosts."

In this quotation from Geraghty's book, the acronym NIS is well known by those skilled in the art to mean "Network Information Services", originally introduced by Sun Microsystems in 1985, to allow central administration of operating system data. NIS has also been referred to as "yellow pages" within the art. And, the acronym NIS is well known by those skilled in the art to mean "network file system", which is a computer file system that allows sharing of files, printers, and other computer resources via a computer network.

According to Wikipedia, file servers were developed in the 1970's, and in 1985, Sun Microsystems introduced their own file system which they called "Network File System", which became one of the first widely adopted network file sharing systems. Wikipedia also notes that NetWare Core Protocol, or "NCP"; Andrew File System, or "AFS"; and Server Message Block, or "SMB"; and Common Internet File System, or "CIFS" are also widely used network file sharing systems. As such, NFS is also a well known term in the art used by ordinarily skilled persons to refer to any of these types of file sharing systems.

Example Use of Netgroups.

To illustrate the complexity and difficulty of the method used by current administrators of LDAP systems, we now present an example of how netgroups are used to administer client privileges. Consider an LDAP server having approximately 100,000 users under various groups, where the default access rights allow all the users can be accessed by all of the LDAP clients (e.g. no restrictions at all). If the requirement changes or arises such that not all the users need to have privileges to access from LDAP client, then how should the administrator to restrict the access for those specific users?

Say, if we want to provide access to various LDAP clients for only 50,000 out of the total 100,000 users, the administrator needs to add all the 50,000 LDAP users to a "netgroups map" file, and then the administrator must define all the group's information in the LDAP clients password files. It not only sounds onerous to do for a large number of users, it is. The process can be divided into four phases:

I. Generate an ldif file containing data from a netgroup table;
II. Import netgroup data in the ldif file into an LDAP server;
III. Verify that entries have been successfully imported into the LDAP server; and
IV. Enable netgroup through LDAP.

Table 1 shows actual steps in one particular LDAP server system to complete this process (other systems are similar in complexity). It uses AIX operating system terminology, which is well known in the industry. For more details for readers not as familiar with AIX and LDAP, one may refer to the previously discussed RedBook by Geraghty.

TABLE 1

Example Configuration and Enablement of netgroup through LDAP on AIX 5.3

1. Apply all known authentication and netgroup patches to the LDAP system.
2. Make a copy of all the files that will be modified:
    /etc/security/ldap/ldap.cfg
    /etc/security/user
    /etc/irs.conf
    /usr/lib/security/methods.cfg
    /etc/passwd
    /etc/group
3. Gather required information.
    What is the suffix to use as the "Netgroup Base DN" root?
    What is the LDAP server hostname?
    What is the LDAP server admin and password?
    What schema is the server configured for?
    Where is the netgroup file?
    In this example, the LDAP server is IDS 5.2 running on AIX 5.3, with the following configuration information:
        Suffix for netgroupbased: cn=aixdata
        LDAP server hostname: daemonbso
        LDAP server admin: cn=admin
        LDAP server admin password: secret
        Schema: rfc2307aix
        netgroup file: /etc/netgroup
        This is the content of the /etc/netgroup file:
            testgroup (,nisuser,)
4. Use 'nistoldif' to create an ldif file containing netgroup data:
    # nistoldif -d cn=aixdata -se -S rfc2307aix > /tmp/netgroup.ldif
    This is the content of /tmp/netgroup.ldif from above command:
        dn: ou=Netgroup,cn=aixdata
        objectClass: top
        objectClass: organizationalUnit
        ou: Netgroup
        dn: cn=testgroup,ou=Netgroup,cn=aixdata
        cn: testgroup
        objectClass: top
        objectClass: nisNetgroup
        nisNetgroupTriple: (,nisuser,)
5. Use 'ldapadd' to import ldif data file to LDAP server:
    # ldapadd -h daemonbso -D cn=admin -w secret -f/tmp/netgroup.ldif
    adding new entry ou=Netgroup,cn=aixdata
    adding new entry cn=testgroup,ou=Netgroup,cn=aixdata
6. Verify that new entries have been added via ldapsearch:
    Here's one way to do it:
    # ldapsearch -h daemonbso -D cn=admin -w secret -b cn=aixdata -s sub
    objectclass=* | grep -p Netgroup
    ou=Netgroup,cn=aixdata
    objectClass=top
    objectClass=organizationalUnit TABLE 1-continued Example Configuration and Enablement of netgroup through LDAP on AIX 5.3 ou=Netgroup
    cn=testgroup,ou=Netgroup,cn=aixdata
    cn=testgroup
    objectClass=top
    objectClass=nisNetgroup
    nisNetgroupTriple=(,nisuser,)
7. Verify that you can still query and login as the user in your netgroup map. For this example, the login name is "nisuser".
    # lsuser -R LDAP nisuser
    nisuser id=261 pgrp=staff groups=staff home=/home/nisuser shell=/usr/bin/ksh login=true ...
    (Login example not shown here, but verify that it works)
8. Enable netgroup through LDAP by configuring ldap.cfg, methods.cfg, irs.conf, and /etc/security/user, /etc/passwd, and /etc/group files:
    a. Edit /etc/security/ldap/ldap.cfg file:
        Configure netgroupbasedn option as shown below:
            ldapservers:daemonbso
            binddn:cn=admin
            bindpwd:secret
            netgroupbasedn:ou=Netgroup,cn=aixdata
            Note: The bindpwd above may also be in DES encrypted format, i.e.:
            bindpwd:{DES}E5B8 09690FF9C CE961FC6470E7F2EB
        Restart secldapclntd by running the command below:
            # restart-secldapclntd
    b. Edit /usr/lib/security/methods.cfg file:
        Add the netgroup option to the LDAP stanza as shown below:
            LDAP:
            program = /usr/lib/security/LDAP
            program_64 =/usr/lib/security/LDAP64
            options = netgroup
    c. Edit /etc/irs.conf file:
        Add netgroup nis_ldap search parameter as shown below:
            netgroup nis_ldap
        At this point, note that you can no longer query for "nisuser" in the LDAP registry:
            # lsuser -R LDAP nisuser
            3004-687 User "nisuser" does not exist.
        Even listing ALL users won't work because once you enable netgroup on LDAP, the LDAP users and groups are considered "compat" users
            # lsuser -R LDAP ALL
            <empty>
    d. Edit /etc/security/user file:
        Create a new stanza for the test netgroup user as shown below:
            nisuser:
            SYSTEM = "compat"
            registry = compat
    e. Edit /etc/passwd file:
        Append nis netgroup escape sequence to the end of /etc/passwd file as shown below:
            # echo "+@testgroup" >> /etc/passwd
    f. Edit /etc/group file:
        Append nis netgroup escape sequence to the end of /etc/group file as shown below:
            # echo "+:" >> /etc/group
9. Verify that you can query and login as a netgroup user.
    # lsuser -R compat nisuser
    nisuser id=261 pgrp=staff groups=staff home=/home/nisuser shell=/usr/bin/ksh login=true ...
    The query should also work without the "-R compat" option:
    # lsuser nisuser
    nisuser id=261 pgrp=staff groups=staff home=/home/nisuser shell=/usr/bin/ksh login=true ...
    (Login example not shown)

Now that netgroup is enabled in the LDAP server, each of the 50,000 users must be added to the netgroup map file, which is cumbersome, and which will have a negative performance impact on the system.

Our New Method of LDAP User Privilege Administration

After recognizing this problem can be solved, we set forward to develop a more efficient manner to accomplish user rights management in an LDAP server, including certain modifications to portions of the LDAP server and its configuration files to enable the improved administration of user rights.

According to our new process, LDAP users are defined under the groups. We added new attributes for the groups called "remote_allowed" and "hosts". By default, we have modified the design of the system such that the "remote_allowed" attribute will be set to true for the groups. With remote_allowed=true, all users under these groups will be enabled to access any LDAP client configured with that LDAP server.

If an administrator wants to restrict the access for certain number of users, then those users are configured under a group with "remote_allowed" attribute set to false. With remote_allowed=false, our improved handling of user access rights is enabled for the users in that group.

So, for users in the group with remote_allowed=false, and, if they need to access certain LDAP clients, then the administrator defined our new "hosts" attribute for the group with the LDAP client(s) hostname/IP address.

This provides several advantages over the ordinary netgroup process:
(a) it reduces the complexity of administration;
(b) it is easy to setup, and thus saves time;
(c) it is easily accessible from all the LDAP clients; and
(d) it is easy to manage the group's privileges.

Example of Operation

Now, we will describe an example operation of our invention, which is meant to illustrate the invention, but not to establish limits or restrictions on the use of the invention.

Figure 7:
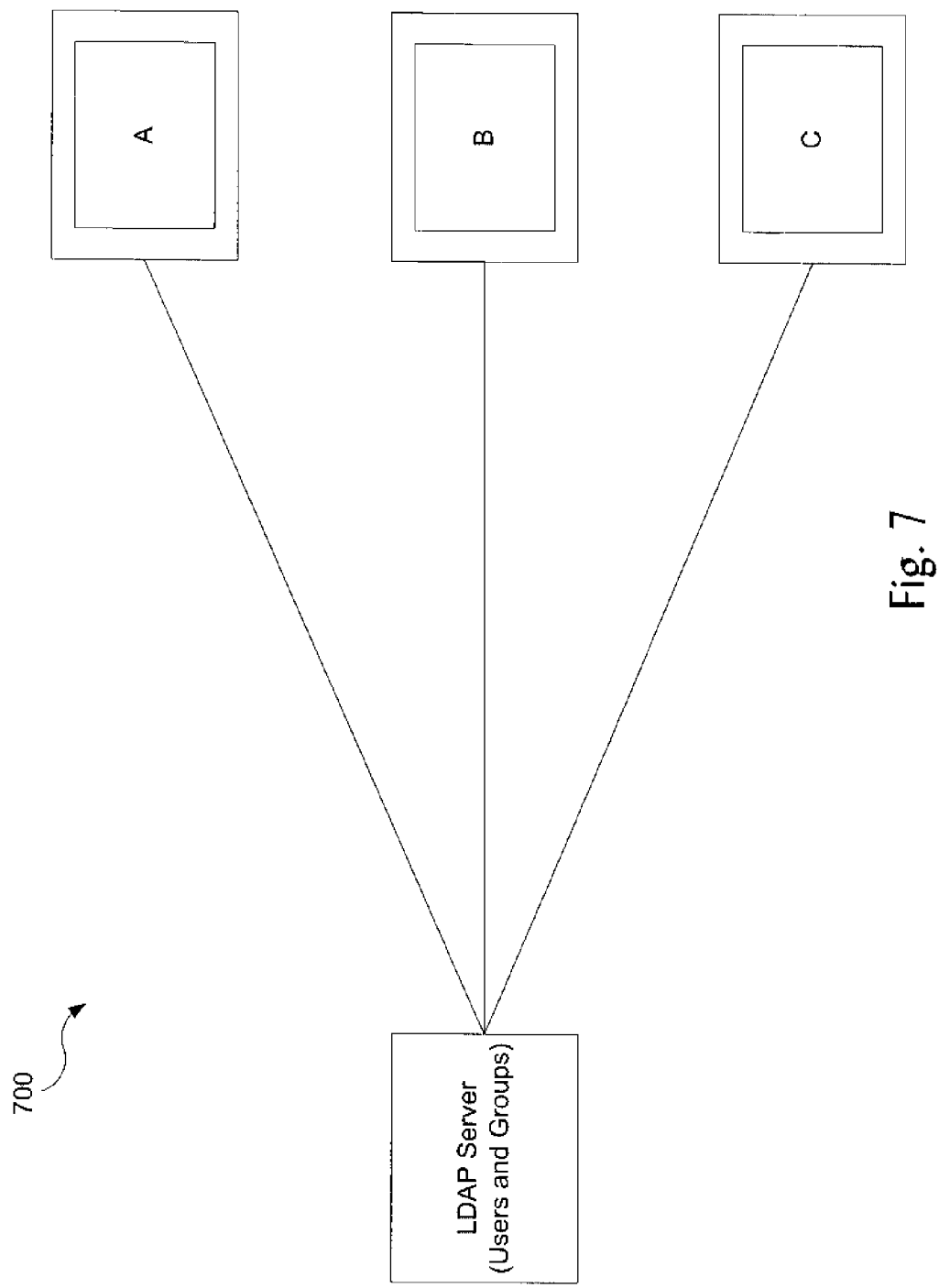
FIG. 7 provides a reference diagram for illustration of a provide operation example of the invention.

As shown (700) in FIG. 7, an LDAP server can be used to manage large number of users and groups information. It's configured with different LDAP clients, which we will refer to as A, B & C. Our requirement, for this example embodiment, is such that we need to restrict the access for certain number of users for different clients.

So, according to our invention, by default all the users will have the privilege to access any LDAP client with the group's "remote_allowed" attribute set to true. If we want to implement above requirement, then we set the remote_allowed attribute allowed to false, such that the users can't login to any of the LDAP clients A, B & C. Now, for the users who should be allowed to login to either A, B or C LDAP clients, we set define the "hosts" attribute with the hostnames—A, B, or C—that each user is allowed to login to. In this manner, without using netgroups or configuration of an LDAP server to enable netgroups, we provide an alternative method for controlling user access to other LDAP clients through remote access to those clients.

General Logical Process

The following generalize logical process can be implemented in a number of ways, some depending on which LDAP server platform is being augmented or improved. So, we first set forth a high-level description of the logical process of the invention.

Figure 8:
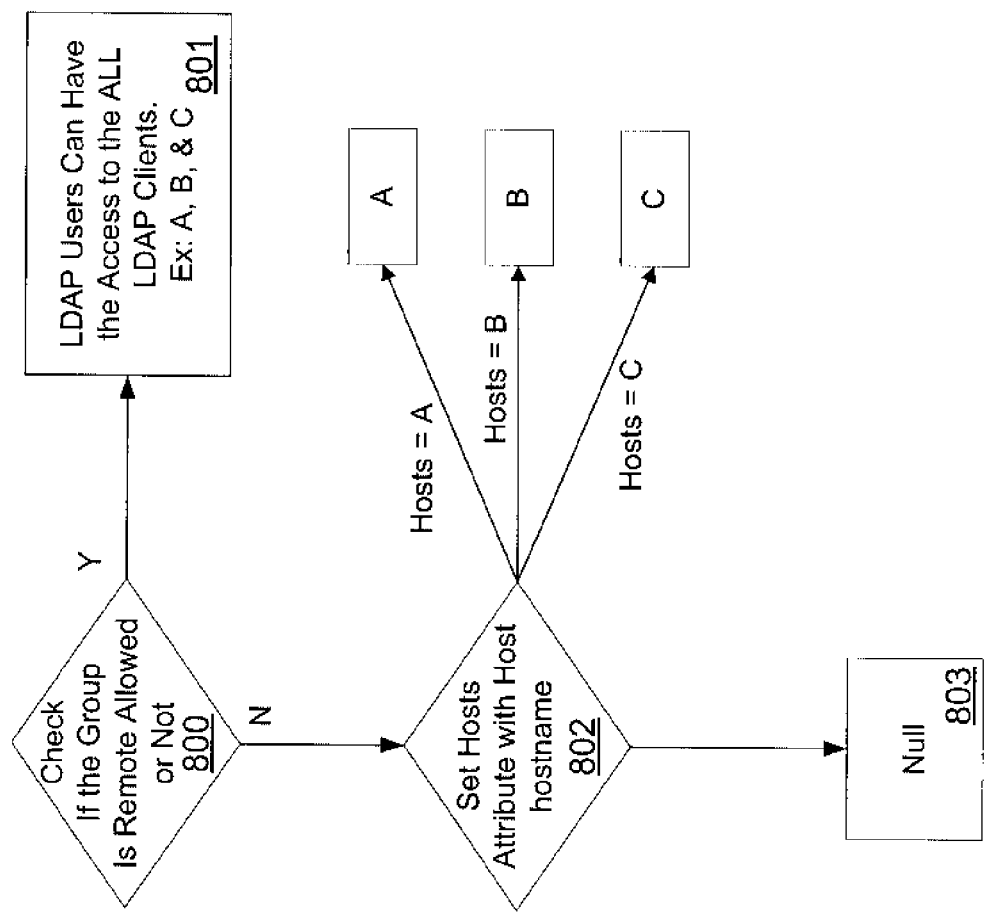
FIG. 8 sets forth a generalized logical process for configuring the invention.

Turning to FIG. 8, to configure the invention, an administrator first checks (800) to determine if remote logging into of clients by other users will be allowed within the particular group of users. If so, the administrator adds a "remote_allowed" attribute to the group definition, and sets the attribute to "true", which will allow all users to log into each other's client devices remotely via the LDAP server (801).

However, if no users are to be allowed to log into other user's client devices, then the administrator adds a remote_allowed attribute to the group definition, and sets the attribute to "false", and does not add a "hosts" attribute.

If one or more users in the group are to be allowed to log into other user's client devices within the group, then the administrator adds a remote_allowed attribute to the group definition, and sets the attribute to "false", and then adds a "hosts" attribute for each user. The "hosts" attribute for each user is further customized to list which hosts that user can remotely access. All other user to client accesses will be blocked, if not specially allowed or listed by the user's "hosts" attribute.

For example, Table 2 illustrates several configurations, as noted in the comments, using a markup-language type of declaration:

TABLE 2

Example Configuration of Remote_allowed and Hosts Attributes

```
// For a group of users A, B, and C, all users are allowed to access the
clients
// client1, client2 and client3.
<group>
    <attribute> remote_allowed     // all access allowed
        <attribute_value> "true" </attribute_value>
    </attribute>
    <member> user=A </member>
    <member> user=B </member>
    <member> user=C </member>
</group>
// For group of LDAP users D, E, F, no users are allowed to access LDAP
// clients client1, client2 and client3.
<group>
    <attribute> remote_allowed // group-wide default access disabled
        <attribute_value> "false" </attribute_value>
    </attribute>
    <member> user=D </member>
    <member> user=E </member>
    <member> user=F </member>
</group>
// For group of LDAP users H, J, and K are allowed to access the LDAP
// clients client1 and client2, but not to access client3.
<group>
    <attribute> remote_allowed // group-wide default access disabled
        <attribute_value> "false" </attribute_value>
        <hosts> client1, client2 </hosts>
    </attribute>
    <member> user=H </member>
    <member> user=J </member>
    <member> user=K </member>
</group>
```

Logical Process for Authorization of Remote Access

Turning to FIG. 1, a logical process according to the present invention is shown for authorization of remote access to clients in an LDAP arrangement. When a group is created, it will have to have the attributes remote_allowed set to either true or false. If it is not set, the process will assume a default value of true.

The process can be generalized as follows:
(100) responsive to a user requesting remote login to a client through an LDAP server,
  (101) determining if the user is allowed to access the client by verifying if the user's group contains a remote_allowed attribute;
    (102) if "remote_allowed=true", then granting access (110) for the user to log into the client;
    (103) if "remote_allowed=false", then determine if any "hosts" attribute is set for the group;
      (104) verify the user's host login with the hosts attributes of the group;
      (105) if the user's host login matches the hosts attributes of the group, then grant access (110);
      (106) else, deny access (111).

(107) if no "remote_allowed" attribute found, then grant access (110).

(108) if access has been granted, then allow user to perform login or authentication to the client, otherwise, if access was denied, notify the user that rights to the requested client do not exist (109).

Through the process of considering each group, and all groups, for common membership of the requesting user and the target client, users can be specifically enabled to remotely access LDAP clients without the use of "netgroups". If group-wide access is to be blanket allowed, or blanket prohibited, this is implemented quickly and easily, as well.

We believe this improvement to the LDAP server authorization process is much easier to use, much more reliable to configure each user's permissions correctly in one attempt, and much less likely to erroneously enable a user to access another client.

Implementation Strategy

According to one embodiment, the present invention may be implemented in a Tivoli LDAP directory server with minimal changes to the login function software on an LDAP client system, and to the code of the directory server. Other embodiments with other LDAP servers may require source code modifications, or may require circuitry and system component changes, such as implementation with a Sun Microsystems ONE directory server or a Microsoft Active Directory Server.

To configure the invention, an administrator must define the "remote_allowed" and "hosts" attributes in the LDAP server's group definition file. These attributes will be inherited when the administrator creates a group. By default, the "remote_allowed" attribute set to true and the "hosts" attribute set to NULL. When an LDAP user tries to authenticate from an LDAP client, the login function will verify the if the user's group "remote_allowed" attribute is set to true, then he will be allowed to login to the client system. If the "remote_allowed" attribute set to false, then the "hosts" attribute of group will be verified. If the hosts attribute is set with hostnames or IP_addresses, then the hostname or IP_address of the LDAP client where the user tries to login will be compared with "hosts" attribute value. If it matches, then the user will be allowed to login to the system. If not the user will be informed, "Please contact the system administrator".

Suitable Computing Platform

In one embodiment of the invention, the functionality of the invention, including the previously described logical processes, are performed in part or wholly by software executed by a computer, such as a personal computers, web servers, web browsers, or even an appropriately capable portable computing platform, such as personal digital assistant ("PDA"), web-enabled wireless telephone, or other type of personal information management ("PIM") device. In other embodiments, such as system embodiments, part or all of the invention may be realized in circuitry, machinery, and hardware.

Therefore, it is useful to review a generalized architecture of a computing platform which may span the range of implementation, from a high-end web or enterprise server platform, to a personal computer, to a portable PDA or web-enabled wireless phone.

Figure 2A:
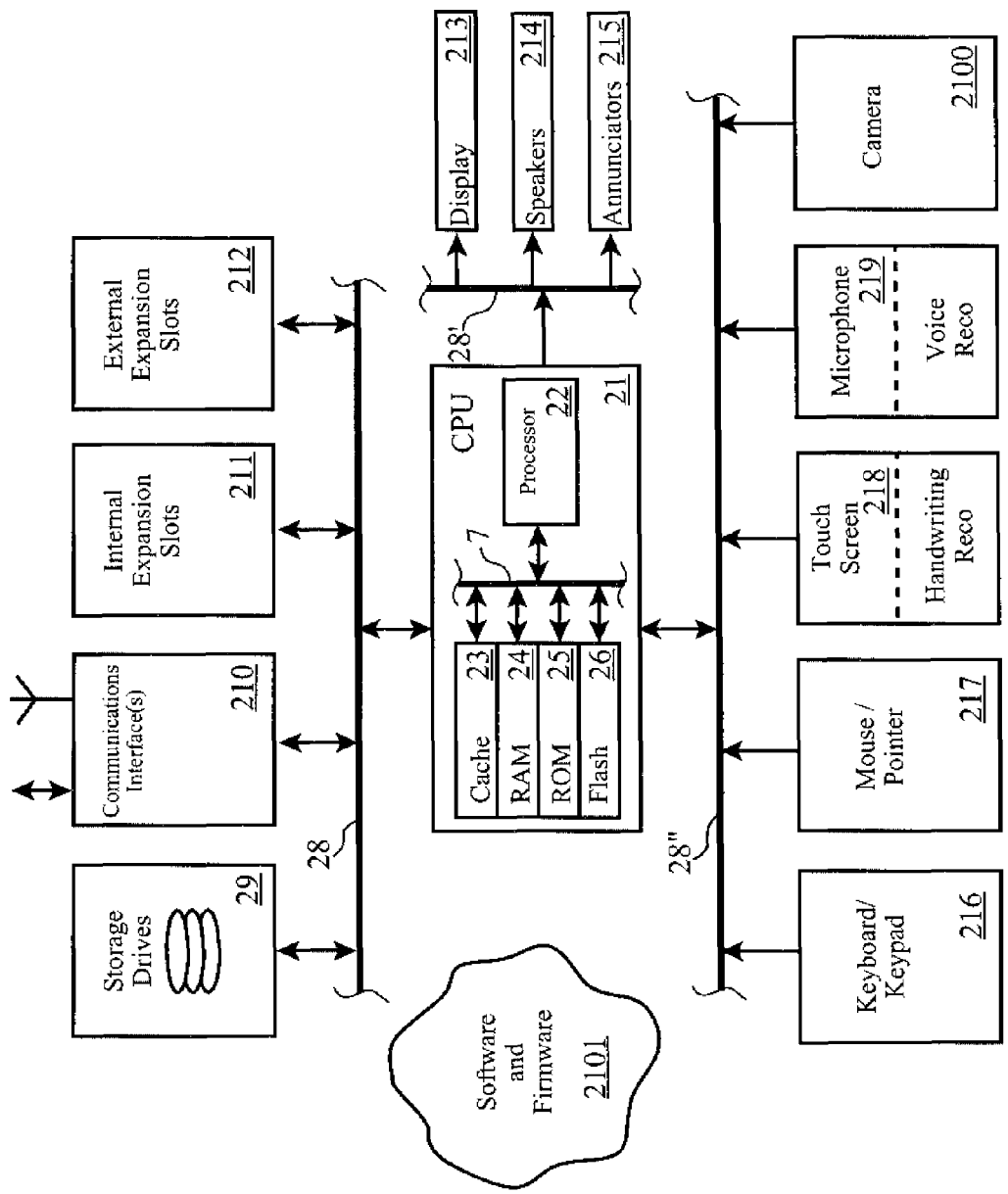
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
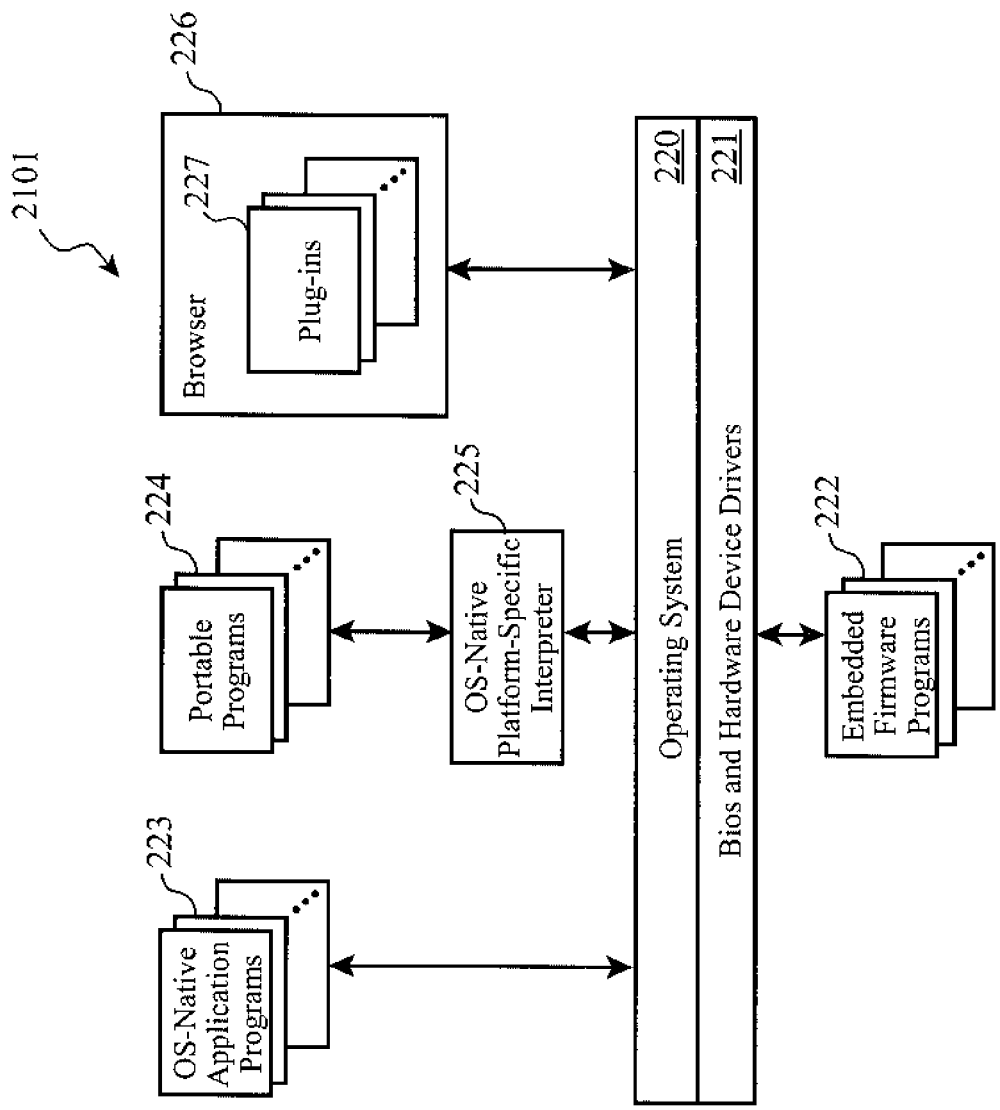

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as realtime operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-Based Embodiments

Alternative embodiments of the present invention include of some or all of the foregoing logical processes and functions of the invention being provided by configuring software, deploying software, downloading software, distributing software, or remotely serving clients in an on-demand environment.

Software Deployment Embodiment.

According to one embodiment of the invention, the methods and processes of the invention are distributed or deployed as a service to by a service provider to a client's computing system(s).

Figure 3A:
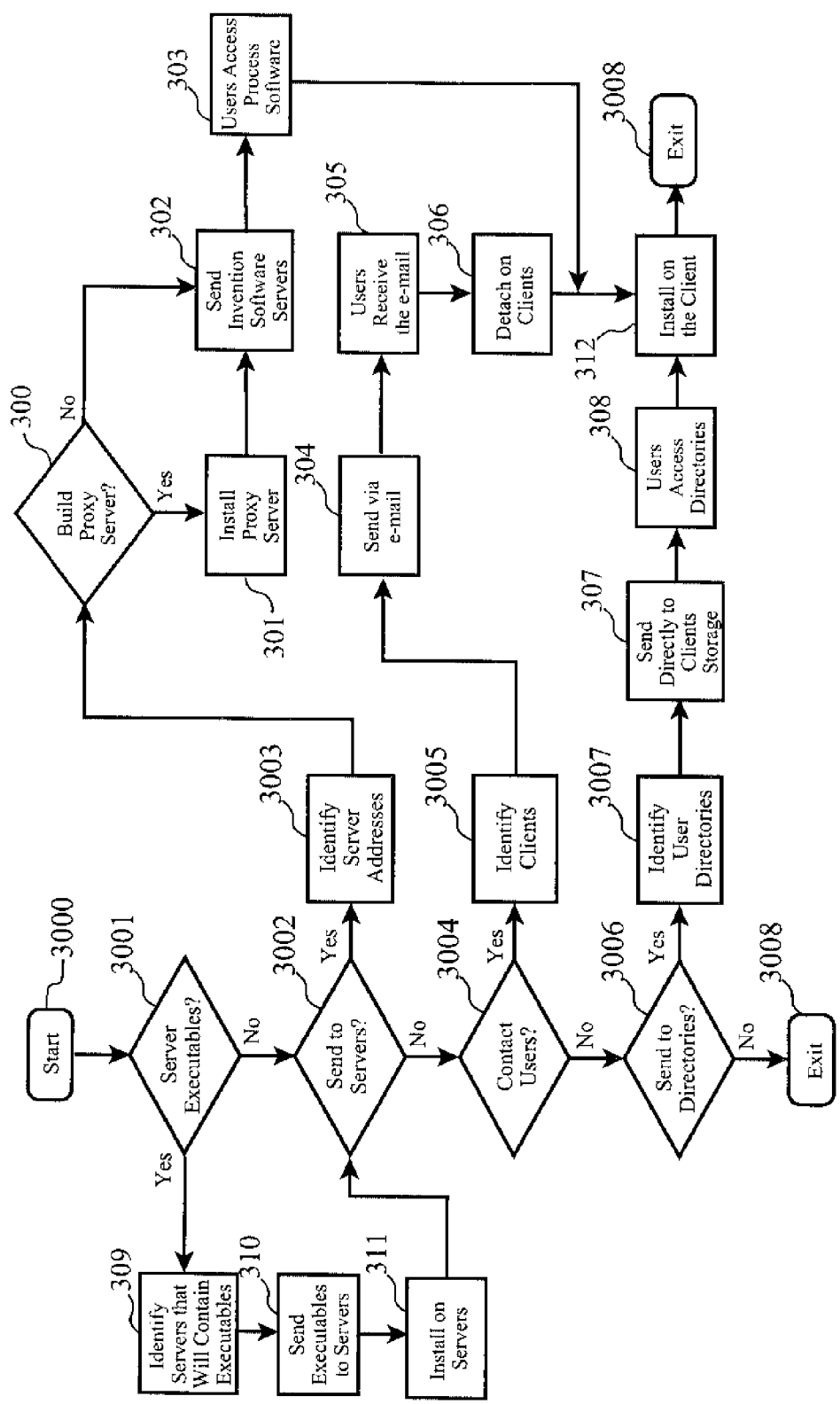
FIG. 3a sets forth a logical process to deploy software to a client in which the deployed software embodies the methods and processes of the present invention.

Turning to FIG. 3a, the deployment process begins (3000) by determining (3001) if there are any programs that will reside on a server or servers when the process software is executed. If this is the case then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it s copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as but not limited to sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
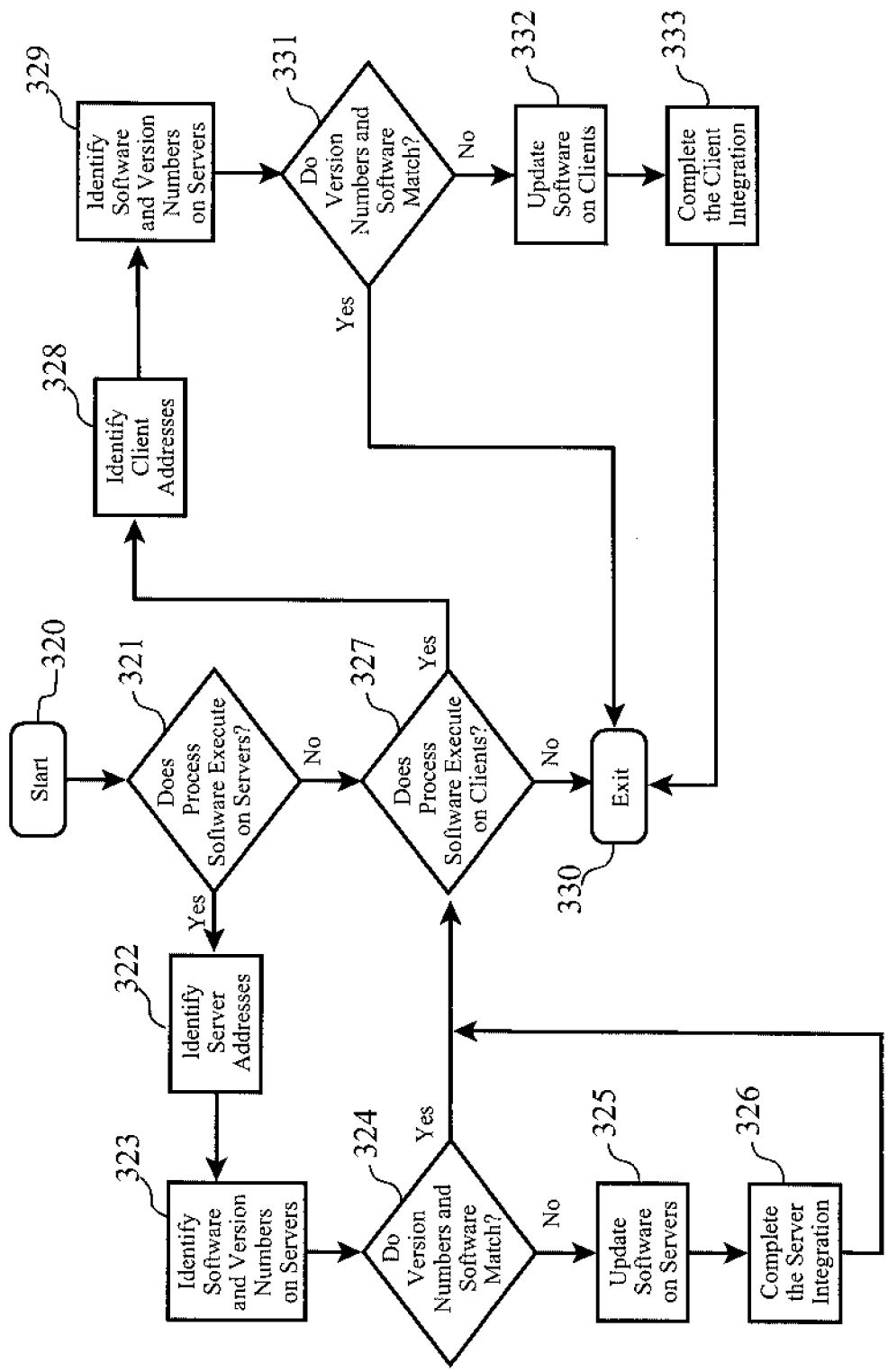
FIG. 3b sets for a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

On-Demand Computing Services Embodiment.

According to another aspect of the present invention, the processes and methods disclosed herein are provided through an on-demand computing architecture to render service to a client by a service provider.

Figure 3C:
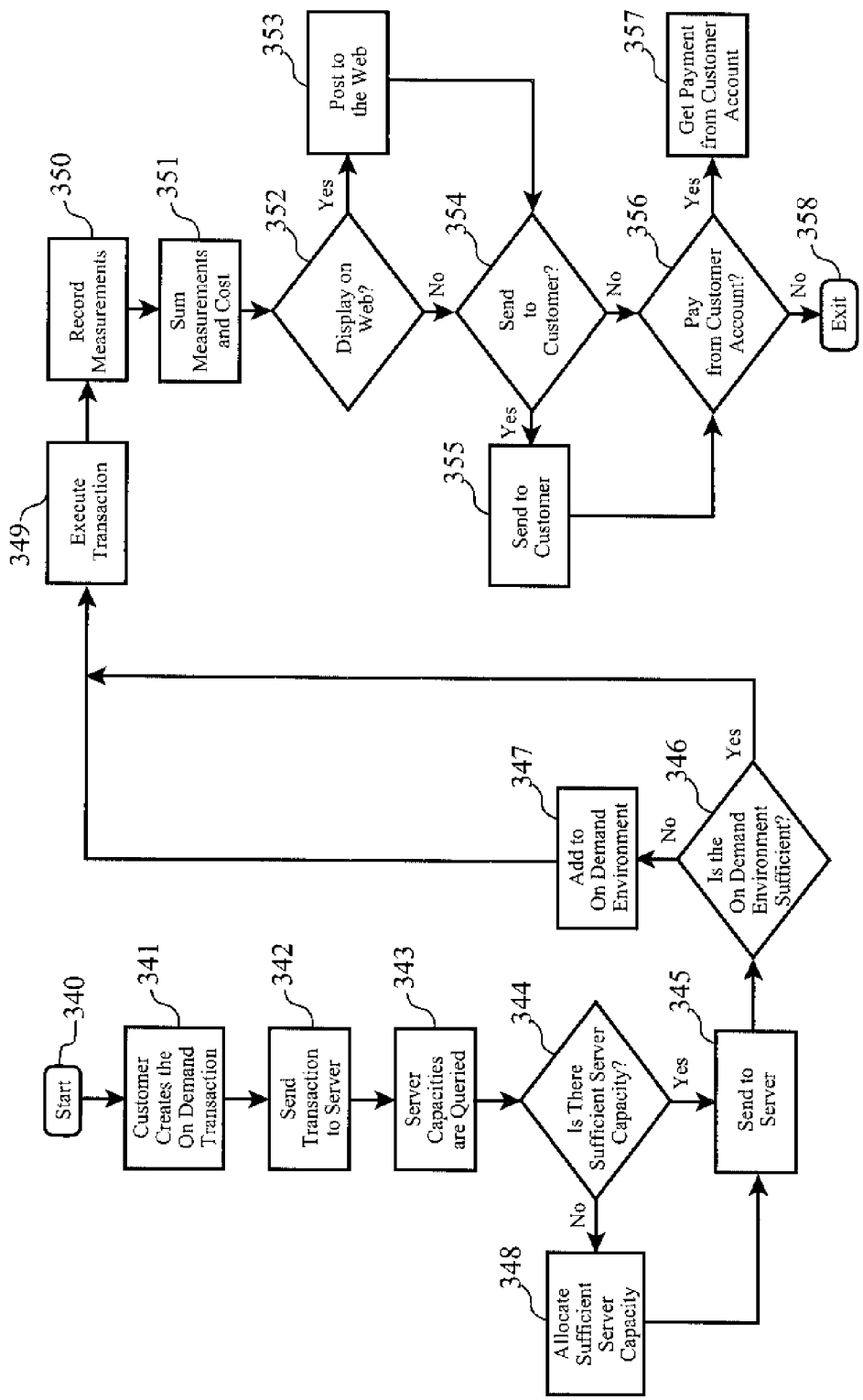
FIG. 3c sets for a logical process to execute software on behalf of a client in an on-demand computing system, in which the executed software embodies the methods and processes of the present invention.

Turning to FIG. 3c, generally speaking, the process software embodying the methods disclosed herein is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On Demand environment the main server can initially be the only server, then as capacity is consume other servers are added to the On Demand environment.

The server central processing unit ("CPU") capacities in the On Demand environment are queried (343). The CPU requirement of the transaction is estimated, then the servers available CPU capacity in the On Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity then the transaction is sent to a selected server (345).

Before executing the transaction, a check is made of the remaining On Demand environment to determine if the environment has sufficient available capacity for processing the transaction. This environment capacity consists of such things as but not limited to network bandwidth, processor memory, storage etc. (345). If there is not sufficient available capacity, then capacity will be added to the On Demand environment (347). Next the required software to process the transaction is accessed, loaded into memory, then the transaction is executed (349).

The usage measurements are recorded (350). The usage measurements consists of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On Demand costs be posted to a web site (352) then they are posted (353). If the customer has requested that the On Demand costs be sent via e-mail to a customer address (354) then they are sent (355). If the customer has requested that the On Demand costs be paid directly from a customer account (356) then payment is received directly from the customer account (357). The last step is to exit the On Demand process.

VPN Deployment Embodiment.

According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
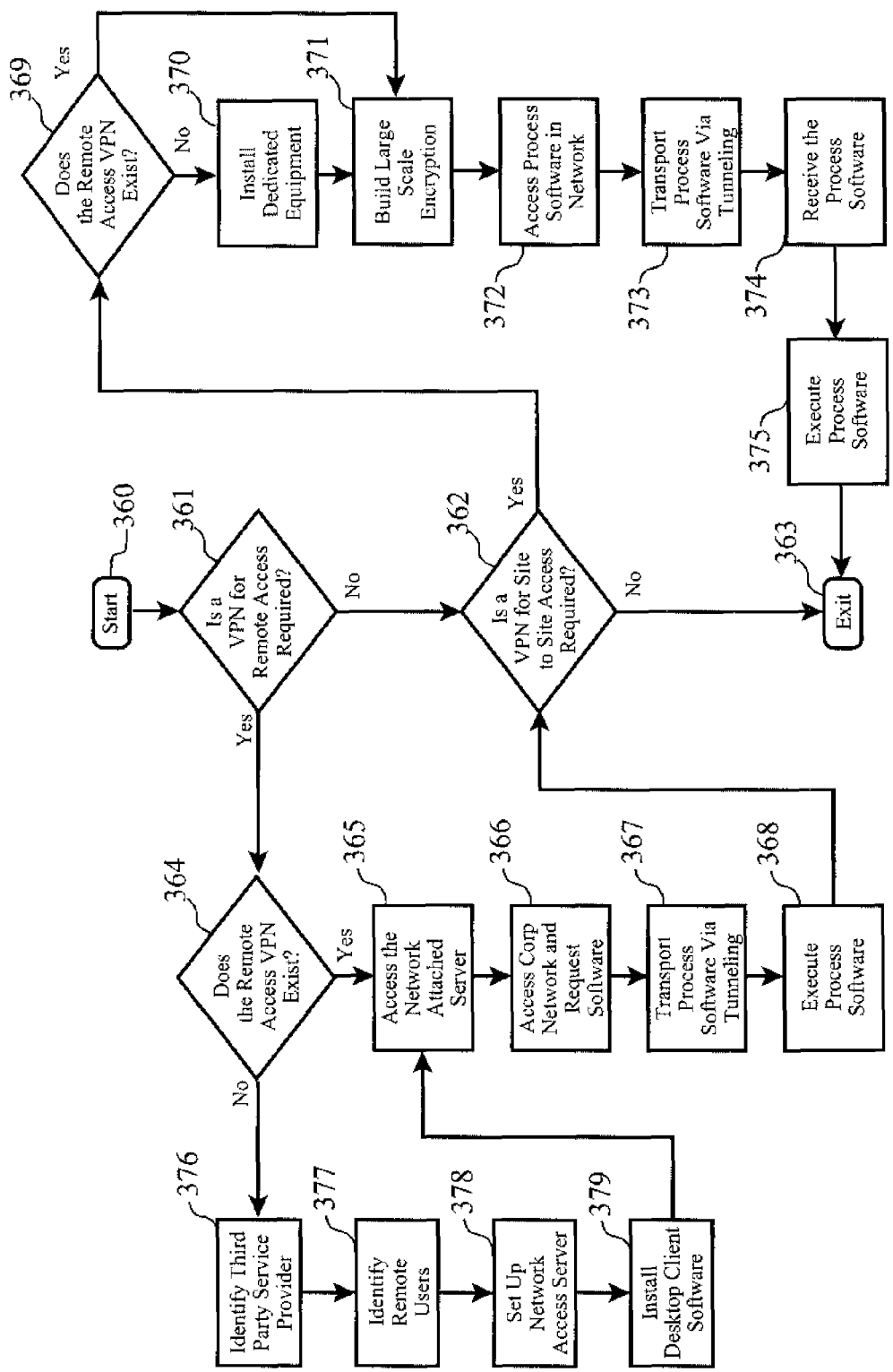
FIG. 3d sets for a logical process to deploy software to a client via a virtual private network, in which the deployed software embodies the methods and processes of the present invention.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from a the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
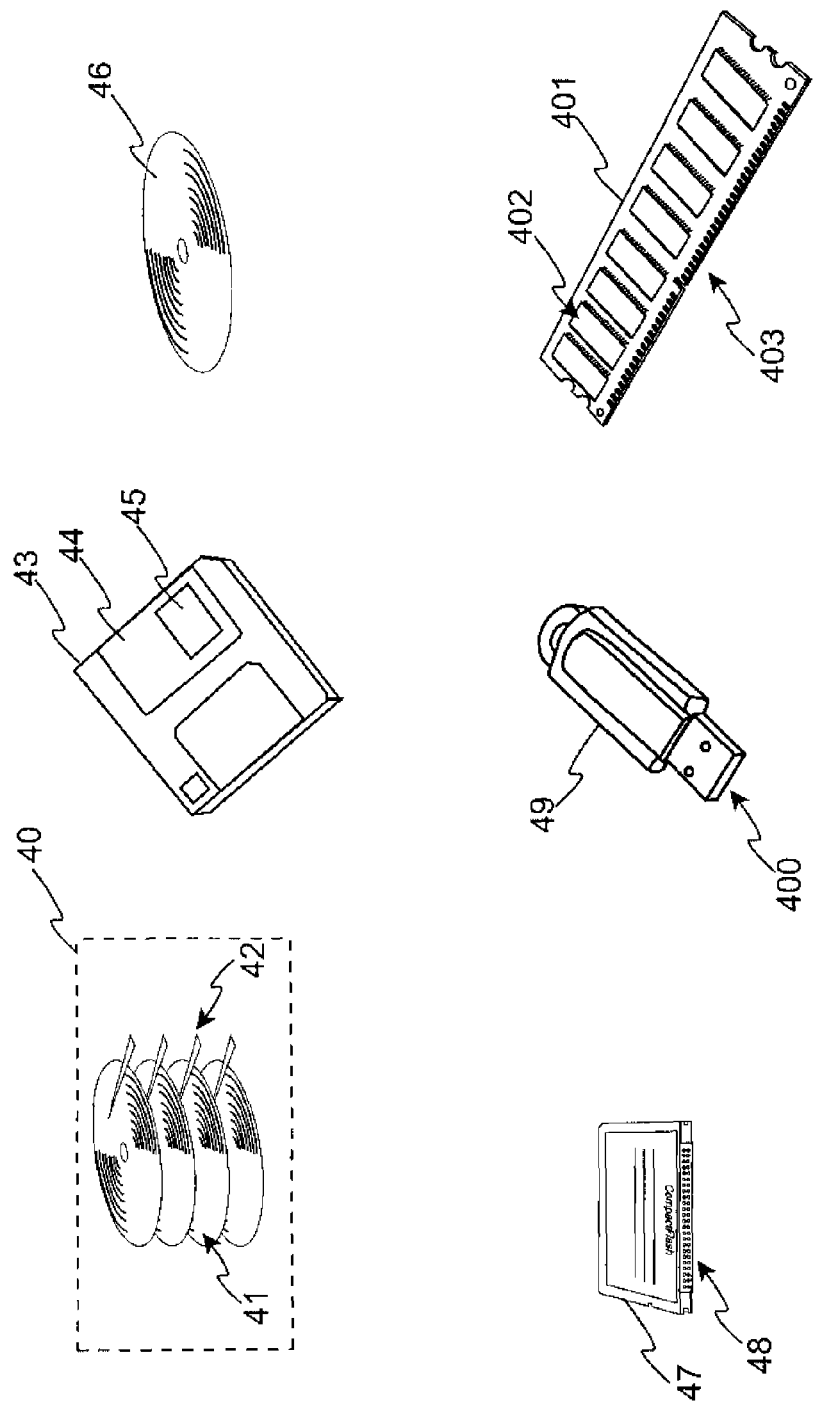
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
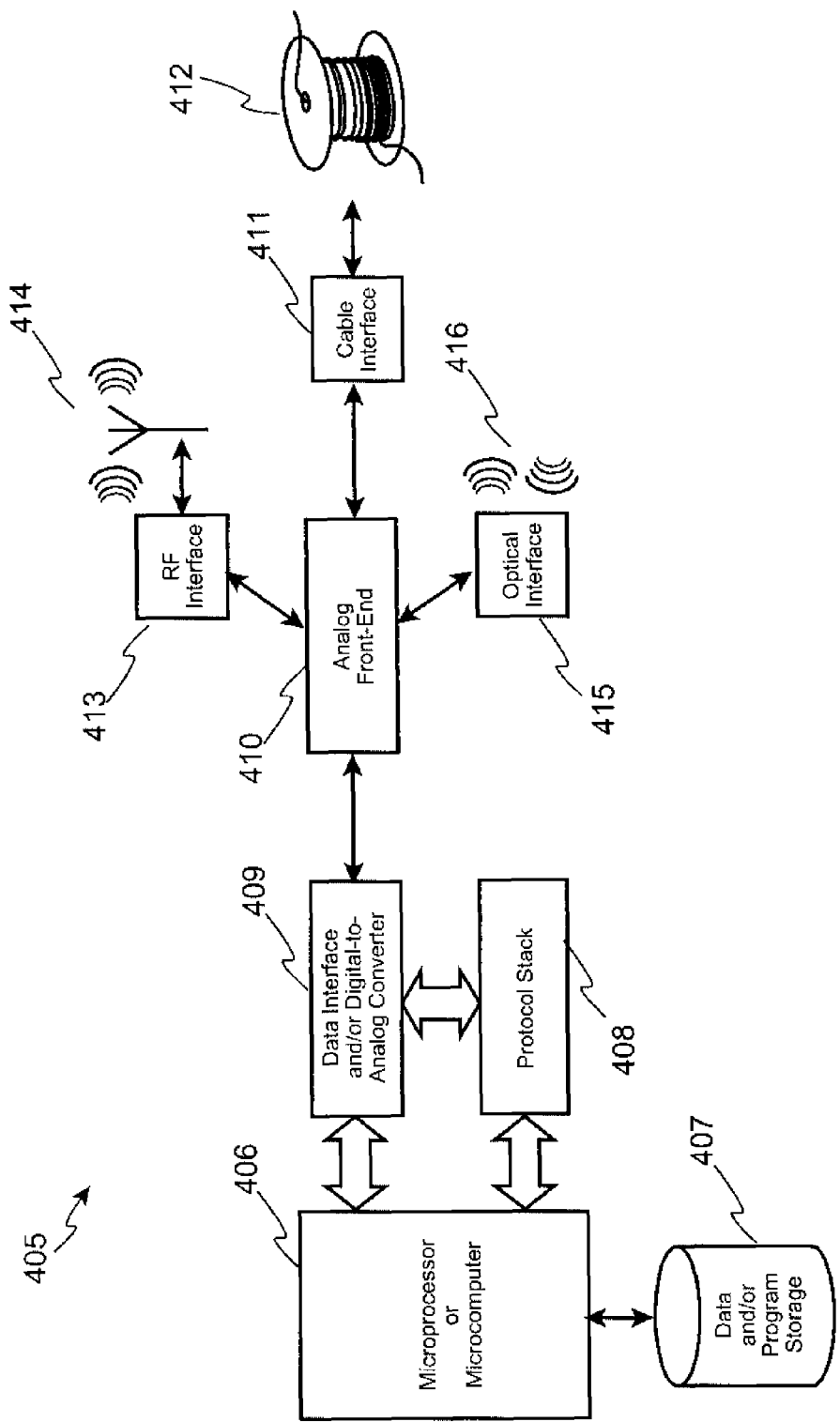

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-periperal embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
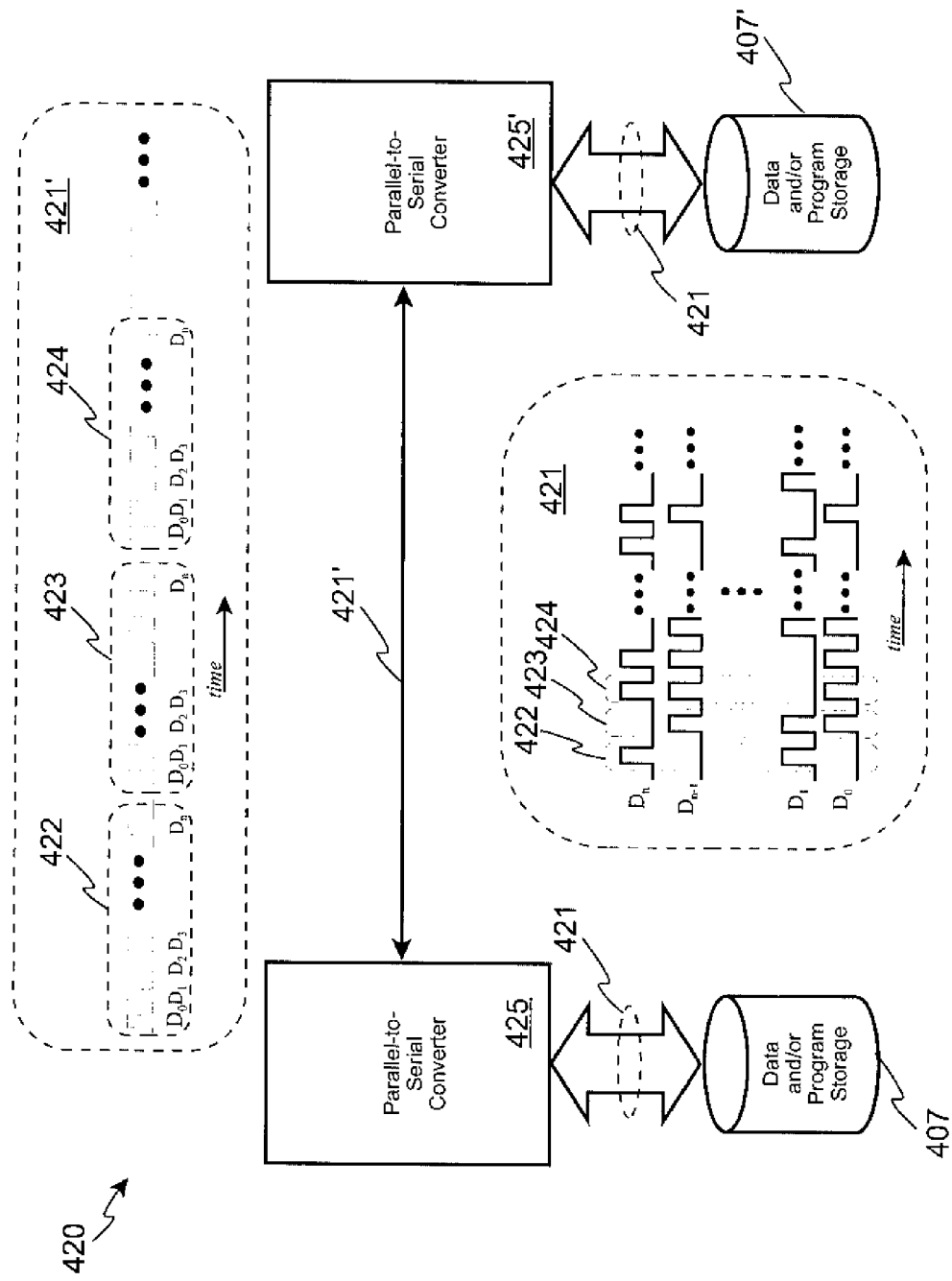
Figure 5:
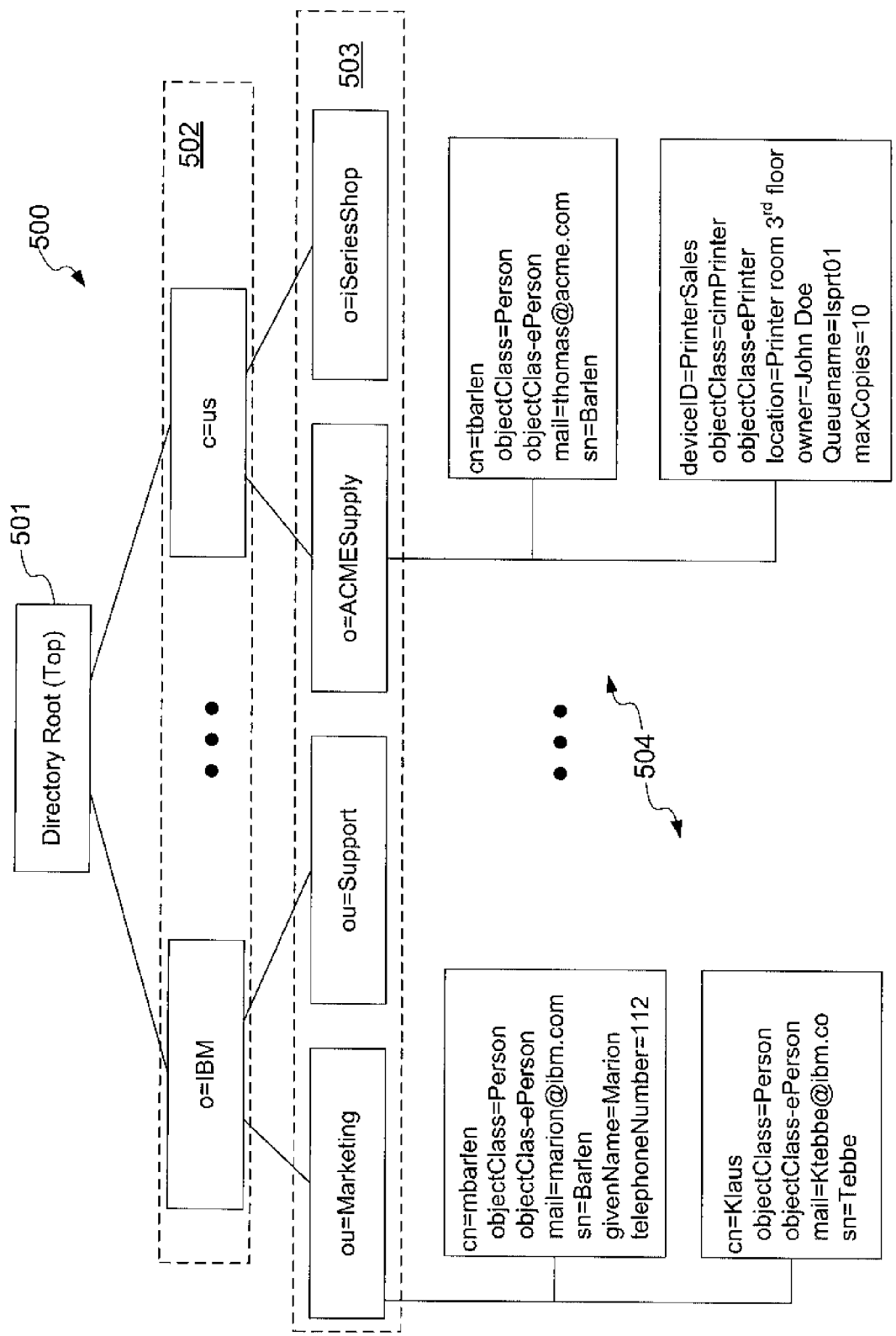
FIG. 5 illustrates an example LDAP tree structure.
Figure 6:
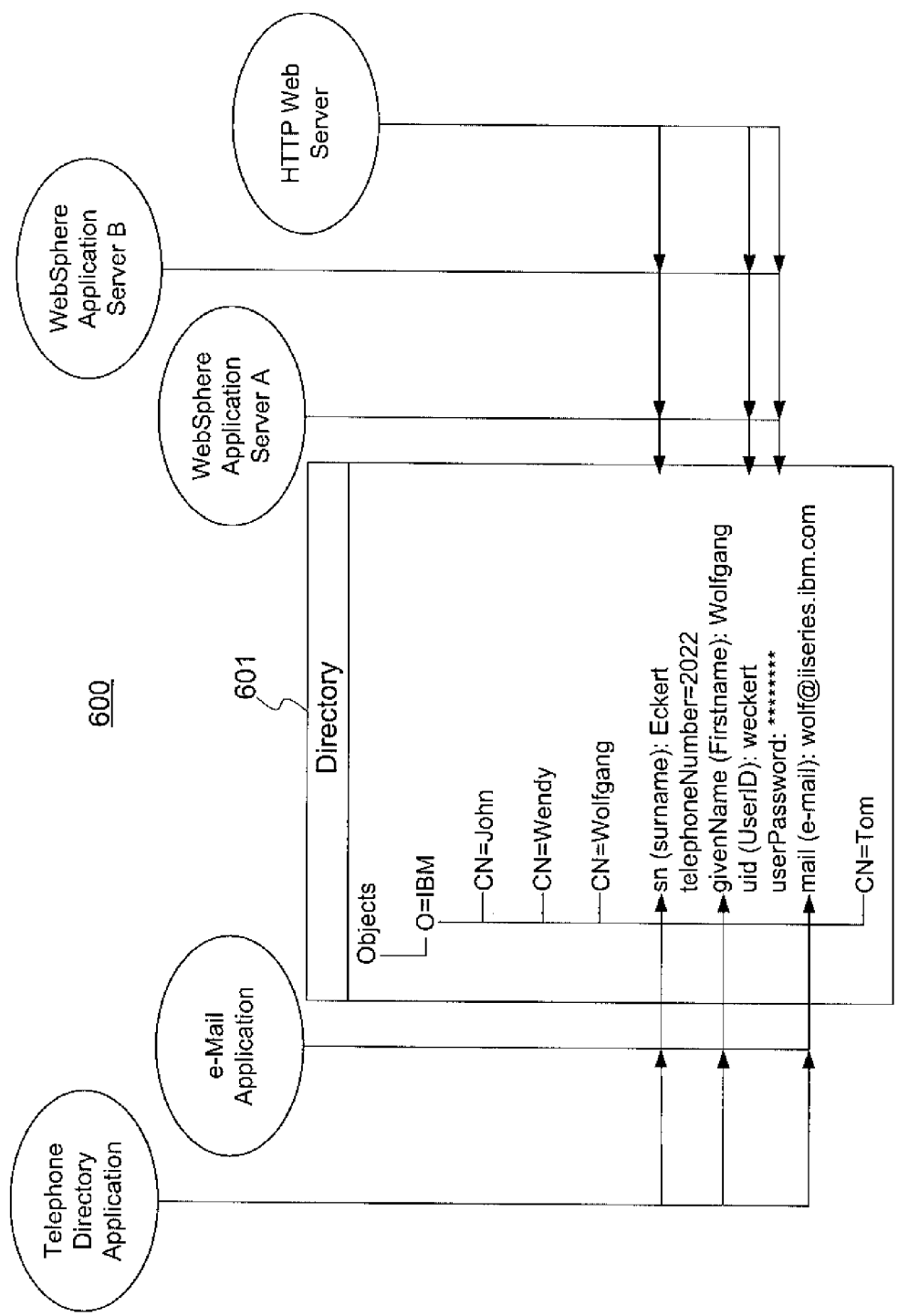
FIG. 6 shows how LDAP can enable heterogeneous applications to access and share data through a common repository.

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as an RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit D0-Dn being on a bus or signal carrier simultaneously, where the "width" of the data unit is n−1. In some systems, D0 is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

CONCLUSION

While certain examples and details of a embodiments have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. A computer-implemented method for configuration of remote directory user privileges to remotely access clients by users of devices within groups comprising:
    responsive to a request from a directory access protocol remote client device to access a specific directory resource:
        responsive to a first access control attribute being set to a default value, permitting by a directory server access to the specific directory resource by all directory access protocol client devices within a defined group of client devices without accessing or referring to an access control list, and without referring to a map file, wherein the group is less than all client devices;
        responsive to the first access control attribute being set to a value other than the default value, searching by the directory server for a second access control attribute, wherein the second access control attribute contains one or more specific hostnames of remote client devices to which access to the specific directory resource is to be granted;
    responsive to the second access control attribute being found and including the hostname of the requesting remote client device, granting access by the requesting remote client device to the specific directory resource; and
    responsive to, subsequent to, and separately from the granting of access, performing authentication between the remote client device and the specific directory resource;
    wherein computer implementation of the method comprises deploying process software using a site-to-site virtual private network including encryption for connecting one or more fixed sites over an unsecured network via tunneling.

2. The method as set forth in claim 1 wherein the authentication comprises a log in process.

3. The method as set forth in claim 1 wherein the directory access protocol remote client device comprises a Lightweight Directory Access Protocol remote client device.

4. The method as set forth in claim 1 wherein the hostname second attribute comprises at least one network address.

5. A computer memory device program product for configuration of remote directory user privileges to remotely access clients within groups, the computer memory device comprising:
    a computer readable storage memory device;
    first computer instruction for execution by a directory server for, responsive to a request from a
        directory access protocol remote client device to access a specific directory resource, and responsive to a first access control attribute being set to a default value, permitting access to the specific directory resource by all directory access protocol client devices within a defined group of client devices without accessing or referring to an access control list, and without referring to a map file, wherein the group is less than all client devices;
    second computer instruction for execution by a directory server for, responsive to the first access control attribute being set to a value other than the default value, searching for a second access control attribute, wherein the second access control attribute contains one or more specific hostnames of remote client devices to which access to the specific directory resource is to be granted;

third computer instruction for execution by a directory server for, responsive to the second access control attribute being found and including the hostname of the requesting remote client device, granting access by the requesting remote client device to the specific directory resource; and fourth computer instruction for execution by a directory server for, responsive to, subsequent to, and separately from the granting of access, performing authentication between the remote client device and the specific directory resource;

wherein the first, second, third and fourth computer instructions are stored by the computer readable storage memory device by deploying the computer instructions using a site-to-site virtual private network including encryption for connecting one or more fixed sites over an unsecured network via tunneling.

6. The computer program product as set forth in claim 5 wherein the authentication comprises a log in process.

7. The computer program product as set forth in claim 5 wherein the directory access protocol remote client device comprises a Lightweight Directory Access Protocol remote client device.

8. The computer program product as set forth in claim 5 wherein the second access control attribute comprises at least one network address.

9. A system for remote access of directory resources by clients within groups comprising:

a processor of a directory access control system;

an access granter portion of a directory access control system configured to, responsive to a request from a directory access protocol remote client device to access a specific directory resource:

responsive to a first access control attribute being set to a default value, permit by a directory server access to the specific directory resource by all directory access protocol client devices within a defined group of client devices without accessing or referring to an access control list, and without referring to a map file, wherein the group is less than all client devices;

responsive to the first access control attribute being set to a value other than the default value, search by the directory server for a second access control attribute, wherein the second access control attribute contains one or more specific hostnames of remote client devices to which access to the specific directory resource is to be granted;

responsive to the second access control attribute being found and including the hostname of the requesting remote client device, grant access by the requesting remote client device to the specific directory resource; and an authenticator portion of the directory access control system configured to, responsive to~ subsequent to, and separately from the granting of access, perform authentication between the remote client devices and the specific directory resource;

and a deployer portion of the system for configuring the access granter portion using a site-to-site virtual private network including encryption for connecting one or more fixed sites over an unsecured network via tunneling.

10. The system as set forth in claim 9 wherein the authentication comprises a log in process.

11. The system as set forth in claim 9 wherein the directory access protocol remote client comprises a Lightweight Directory Access Protocol remote client.

12. The system as set forth in claim 9 wherein the second access control attribute comprises at least one network address.

* * * * *